US011060985B2

(12) United States Patent
Mitaka

(10) Patent No.: US 11,060,985 B2
(45) Date of Patent: Jul. 13, 2021

(54) INSPECTING METHOD, INSPECTION SYSTEM, AND MANUFACTURING METHOD

(71) Applicant: Panasonic Intellectual Property Management Co., Ltd., Osaka (JP)

(72) Inventor: Ryosuke Mitaka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 289 days.

(21) Appl. No.: 16/089,313

(22) PCT Filed: Mar. 27, 2017

(86) PCT No.: PCT/JP2017/012394
§ 371 (c)(1),
(2) Date: Sep. 27, 2018

(87) PCT Pub. No.: WO2017/170402
PCT Pub. Date: Oct. 5, 2017

(65) Prior Publication Data
US 2020/0300781 A1 Sep. 24, 2020

(30) Foreign Application Priority Data
Mar. 31, 2016 (JP) .............................. JP2016-072496

(51) Int. Cl.
*G01N 21/958* (2006.01)
*G01N 21/88* (2006.01)
*G01N 21/956* (2006.01)

(52) U.S. Cl.
CPC ....... *G01N 21/958* (2013.01); *G01N 21/8806* (2013.01); *G01N 21/95607* (2013.01); *G01N 2021/95615* (2013.01)

(58) Field of Classification Search
CPC ....... G01N 21/958; G01N 2021/95615; G01N 21/8806; G01N 21/956; G01N 21/95607
(Continued)

(56) References Cited

U.S. PATENT DOCUMENTS 4,540,278 A * 9/1985 Phillips ............... G03F 7/70241
355/45
2007/0216897 A1 9/2007 Sonda
(Continued)

FOREIGN PATENT DOCUMENTS

JP 2001-356007 A 12/2001
JP 2005-181070 A 7/2005
(Continued)

OTHER PUBLICATIONS

International Search Report issued in Application No. PCT/JP2017/012394 dated Jun. 13, 2017, with English translation.

*Primary Examiner* — Tri T Ton
(74) *Attorney, Agent, or Firm* — McDermott Will & Emery LLP

(57) ABSTRACT

The inspecting method is for a product including a transparent substrate and a part placed at a predetermined position within a front surface of the transparent substrate, and includes an imaging step and an evaluating step. The imaging step is a step of taking an image of the front surface by an imaging device with the front surface being illuminated by an illuminating device. The evaluating step is a step of evaluating a degree of matching between an image which is derived from the image (P10) taken by the imaging device and shows a position corresponding to the predetermined position and its vicinity, and a template. The template is indicative of a positional relationship between a real image and a virtual image, of the part in a case where the part is placed at the predetermined position correctly.

7 Claims, 7 Drawing Sheets

(58) Field of Classification Search
USPC ........................ 356/237.1–237.6, 239.1–239.8
See application file for complete search history.

(56) References Cited

U.S. PATENT DOCUMENTS

| | | |
|---|---|---|
| 2008/0278718 A1 | 11/2008 | Sonda |
| 2012/0194668 A1 | 8/2012 | Kim et al. |
| 2015/0016071 A1 | 1/2015 | Nishioka et al. |
| 2017/0301592 A1* | 10/2017 | Takeda ................ H01L 41/1873 |

FOREIGN PATENT DOCUMENTS

| | | |
|---|---|---|
| JP | 2012-159487 A | 8/2012 |
| JP | 2015-034812 A | 2/2015 |
| WO | 2006/057125 A1 | 6/2006 |

* cited by examiner

INSPECTING METHOD, INSPECTION SYSTEM, AND MANUFACTURING METHOD

RELATED APPLICATIONS

This application is the U.S. National Phase under 35 U.S.C. § 371 of International Application No. PCT/JP2017/012,394, filed on Mar. 27, 2017, which in turn claims the benefit of Japanese Application No. 2016-072496, filed on Mar. 31, 2016, the disclosures of which are incorporated in their entirety by reference herein.

TECHNICAL FIELD

The present disclosure relates to inspecting methods, inspection systems, and manufacturing methods, and in particular to an inspecting method, an inspection system, and a manufacturing method, suitable for a product including a transparent substrate and a part placed at a predetermined position within a front surface of the transparent substrate.

BACKGROUND ART

In the past, there have been proposed methods and devices for detecting surface defects of transparent plate-shaped members (e.g., see Patent Literature 1). The device disclosed in Patent Literature 1 includes an illuminating device for providing linear illuminating light to a front surface of a transparent glass substrate at an oblique angle, a line sensor for receiving the linear illuminating light specularly reflected from the front surface, and an image processing device for detecting defects which may present in the transparent glass substrate based on output from the line sensor.

On the other hand, there may be demand to determine whether or not parts are correctly placed at predetermined positions on a transparent substrate such as a glass substrate. According to Literature 1, it may be possible to determine that something is present on the transparent substrate but it is not possible to identify something as a defect or a part.

CITATION LIST

Patent Literature

Patent Literature 1 JP 2005-181070 A

SUMMARY

An object of one aspect according to the present disclosure would be to propose an inspecting method and an inspection system capable of improving accuracy of inspection for a product including a transparent substrate. And, an object of another aspect according to the present disclosure would be to propose a manufacturing method capable of improving quality of a product including a transparent substrate.

An inspecting method of one aspect according to the present disclosure is an inspecting method for a product including a transparent substrate and a part placed at a predetermined position within a front surface of the transparent substrate, and includes an imaging step and an evaluating step. The imaging step is a step of taking an image of the front surface by an imaging device with the front surface being illuminated by an illuminating device. The evaluating step is a step of evaluating a degree of matching between an image which is derived from the image taken by the imaging device and shows a position corresponding to the predetermined position and its vicinity, and a template. The template is indicative of a positional relationship between a real image and a virtual image, of the part in a case where the part is placed at the predetermined position correctly.

An inspection system of one aspect according to the present disclosure is an inspection system for a product including a transparent substrate and a part placed at a predetermined position within a front surface of the transparent substrate, and includes an illuminating device, an imaging device, and a processing device. The illuminating device is configured to emit light to the front surface. The imaging device is configured to take an image of the front surface. The processing device is configured to perform the inspecting method according to the above-identified aspect.

A manufacturing method of one aspect according to the present disclosure is a manufacturing method for a product including a transparent substrate and a part placed at a predetermined position within a front surface of the transparent substrate, and includes a step of performing a forming process of forming the part at the predetermined position within the front surface of the transparent substrate. The manufacturing method of the present aspect further includes a step of performing inspection of the product by the inspecting method according the above-identified aspect. The manufacturing method of the present aspect additionally includes a step of performing the forming process again when a result of the inspection indicates failure.

DESCRIPTION OF EMBODIMENTS

1. Embodiments

Figure 1:
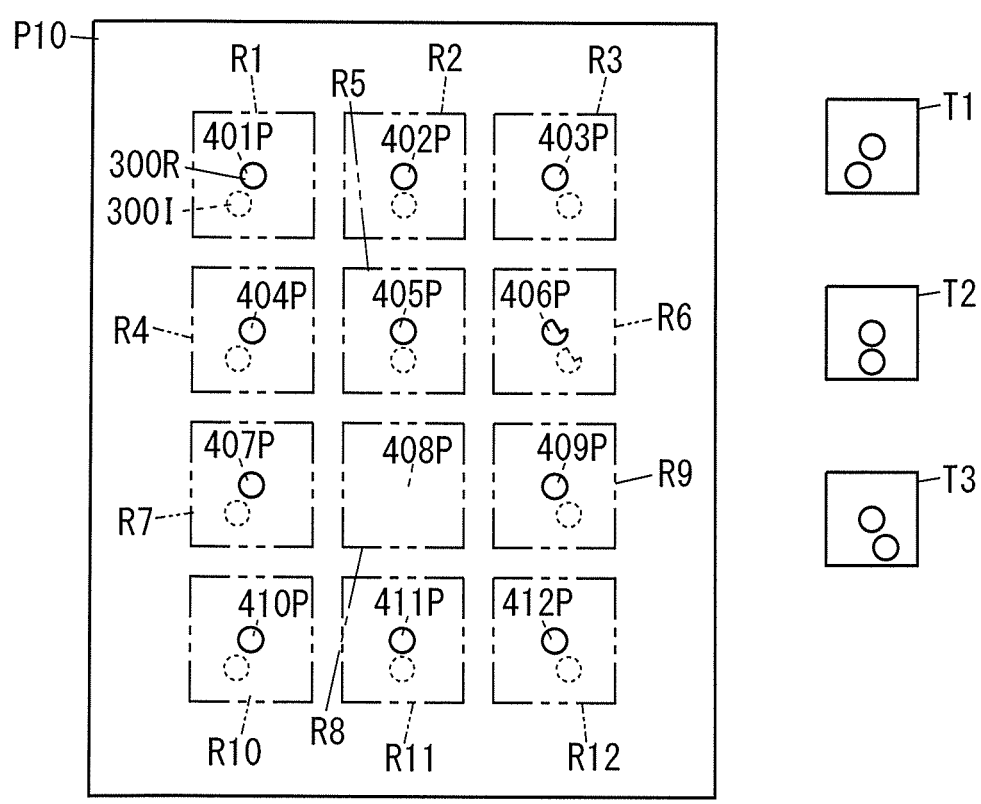
FIG. 1 is an explanatory view of an inspecting method of one embodiment according to the present disclosure.

An inspecting method of one embodiment according to the present disclosure may be a method of inspecting a product 100 as shown in FIG. 2A, for example.

In one example, the product 100 includes a transparent substrate 200 and a plurality of (twelve, in the present embodiment) parts 300. The transparent substrate 200 has a rectangular or square flat plate shape, for example. In other words, the transparent substrate 200 includes a front surface 210 and a rear surface 220 each of which is flat. The transparent substrate 200 may be made of transparent material (e.g., glass and transparent resin), for example. The plurality of parts 300 are individually placed at predetermined positions (arrangement positions) 400 within the front surface 210 of the transparent substrate 200, for example. In FIG. 2A, twelve parts 300 (301 to 312) are arranged at the predetermined positions 400 (401 to 412) which are arranged in 4 by 3 matrix within the front surface 210 of the transparent substrate 200.

The plurality of parts 300 have the same disk shape, for example. The plurality of parts 300 may be made of resin, for example. Note that, the plurality of parts 300 may not always have the same shape and disk shapes. For example, the plurality of parts 300 may have predetermined geometrical shapes (e.g., cone shapes, cuboidal shape, and cylindrical shapes). Alternatively, the part 300 may not be a single resin product, but may be a device constituted by two or more parts (e.g., a semiconductor device). Note that, as to the product 100, the number of parts 300 may be one. In summary, it may be sufficient that the product 100 includes the transparent substrate 200 and at least one part 300 placed at least one predetermined position 400 within the front surface 210 of the transparent substrate 200.

In an actual case where the product 100 is formed, due to some factors, some parts 300 may not be placed at their predetermined positions 400 and/or some parts 300 may be broken. The inspecting method of the present embodiment is used to detect a lack or breakage of part(s) 300.

Figure 2:
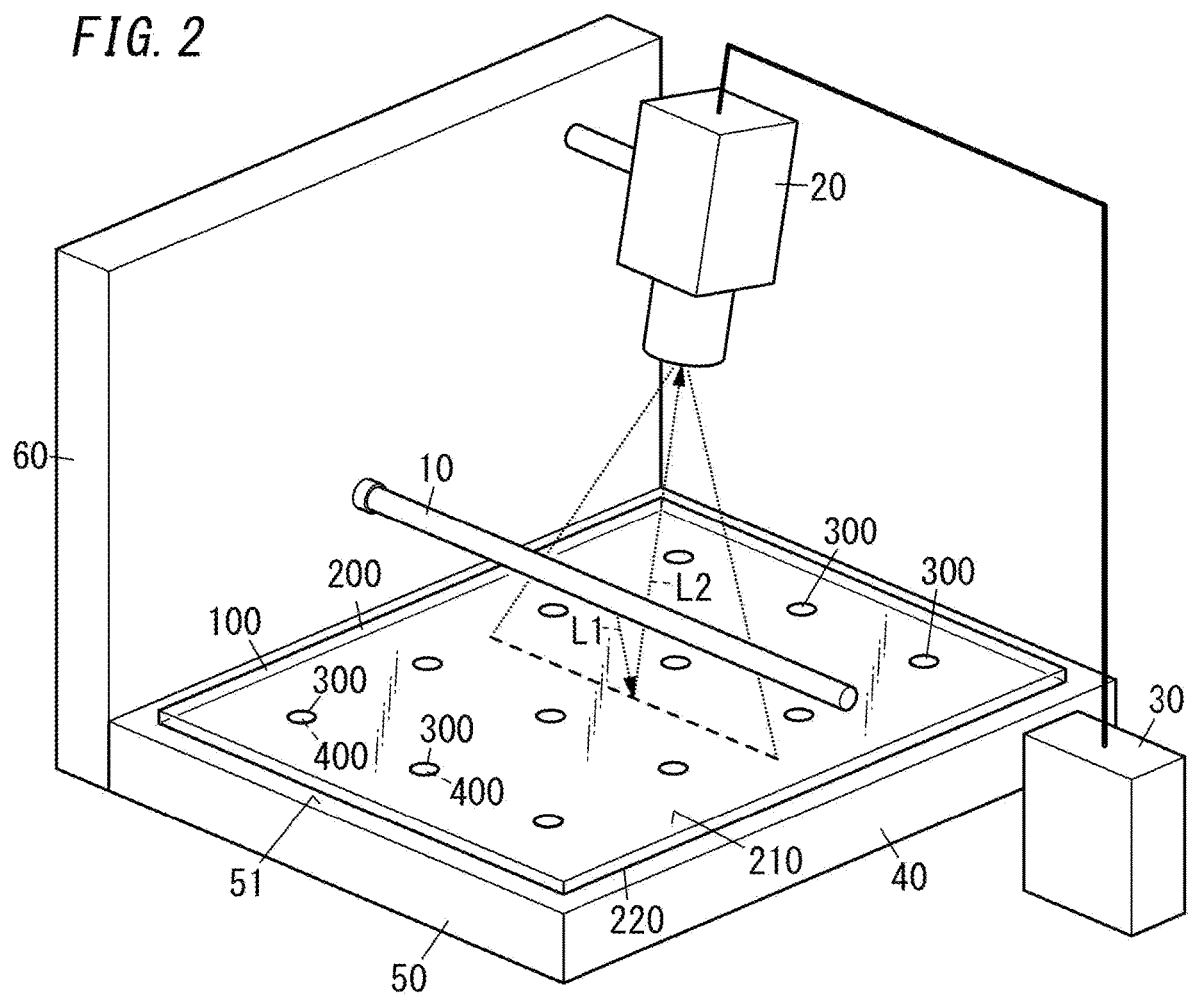
FIG. 2 is a schematic explanatory view of an inspection system for the above inspecting method.

FIG. 2 illustrates a system for implementing the inspecting method of the present embodiment (inspection system). The inspection system includes an illuminating device 10, an imaging device 20, a processing device 30, and a supporting device 40.

The illuminating device 10 is configured to emit light L1 to the front surface 210 of the transparent substrate 200 of the product 100. The illuminating device 10 includes a linear light source, for example. The linear light source may include a plurality of light emitting diodes (LEDs) arranged in line, and a linear Fresnel lens placed in front of the plurality of light emitting diodes. The illuminating device 10 is configured to emit the light L1 to entirely illuminate the front surface 210 in a first direction perpendicular to a thickness direction of the transparent substrate 200 (in FIG. 2, a width direction of the transparent substrate 200).

The imaging device 20 is configured to take an image of the front surface 210 of the transparent substrate 200 of the product 100. The imaging device 20 includes a line camera, for example. The imaging device 20 is configured to take an entire image of the front surface 210 in the first direction of the transparent substrate 200 (in FIG. 2, the width direction of the transparent substrate 200).

Figure 3:
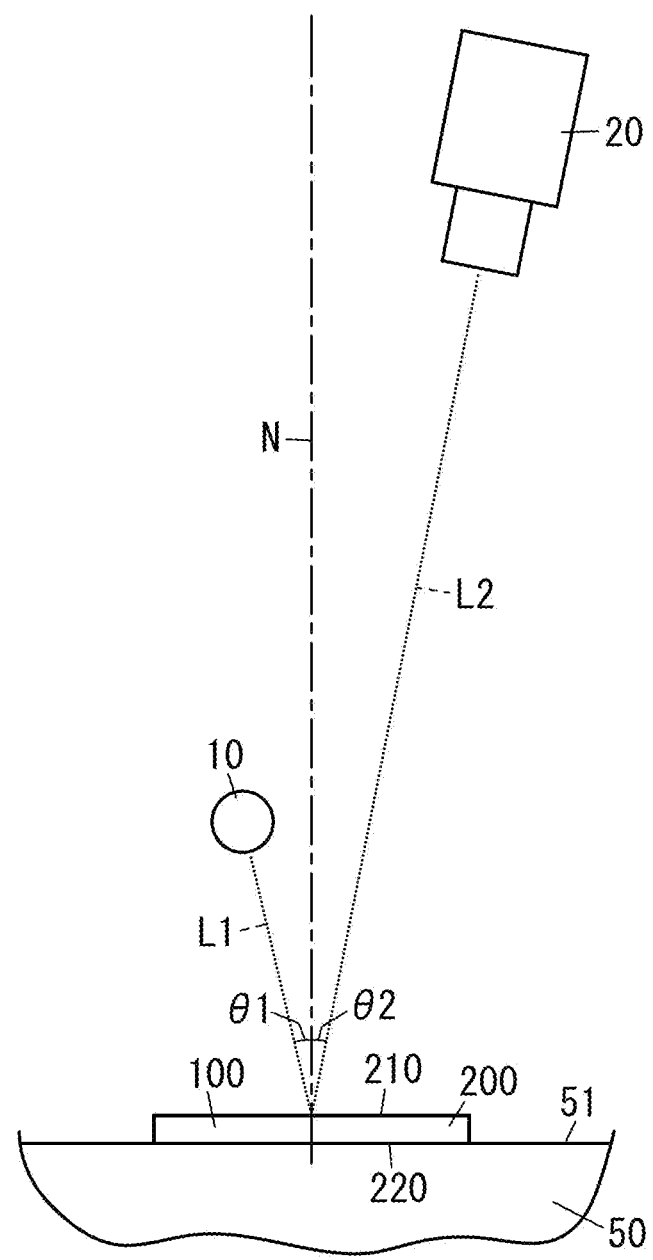
FIG. 3 is an explanatory view for illustration of a positional relationship between an illuminating device and an imaging device of the above inspection system.

As shown in FIG. 3, the illuminating device 10 and the imaging device 20 are arranged to allow the imaging device 20 to receive light which is part of the light L1 from the illuminating device 10 and specularly reflected from the front surface (light L2). Thus, an angle $\theta1$ of an optical axis of the illuminating device 10 to a normal line N of the front surface 210 of the transparent substrate 200 (this corresponds to a normal line of a bearing surface 51) is equal to an angle $\theta2$ of an optical axis of the imaging device 20 to the normal line N. Further, the illuminating device 10 and the imaging device 20 are positioned on opposite sides of the normal line N. Therefore, light which is part of the light L1 from the illuminating device 10 and passes through the product 100 can be suppressed from entering the imaging device 20. Accordingly, it is possible to suppress an object having no relation with the product 100 from appearing in an image from the imaging device 20. As a result, it is possible to improve accuracy of inspection of the product 100 including the transparent substrate 200.

Further, the illuminating device 10 and the imaging device 20 are arranged to allow the imaging device 20 not to directly receive the light L1 from the illuminating device 10.

The supporting device 40 includes a stage 50 and a moving mechanism 60.

The stage 50 has a rectangular plate shape greater in size than the product 100, for example. The stage 50 is a support including the bearing surface 51 where the product 100 is placed. For example, the product 100 is placed on the bearing surface 51 so that the first direction (in FIG. 2, the width direction of the transparent substrate 200) and the second direction (in FIG. 2, the length direction of the transparent substrate 200), of the transparent substrate 200 correspond to a width direction and a length direction, of the bearing surface 51, respectively. The bearing surface 51 may be a glossy and flat surface, for example.

The moving mechanism 60 is configured to move the illuminating device 10 and the imaging device 20 relative to the product 100 on the bearing surface 51 of the stage 50. The moving mechanism 60 moves the illuminating device 10 and the imaging device 20 in the length direction of the bearing surface 51 (the second direction of the transparent substrate 200), for example. Moving ranges of the illuminating device 10 and the imaging device 20 by the moving mechanism 60 are set to allow the imaging device 20 to take an image of the whole of the front surface 210 of the transparent substrate 200, for example. Note that, the moving mechanism 60 can be realized by conventional mechanisms and therefore no detailed explanation thereof is given. Further, to simplify the illustration in FIG. 2, the moving mechanism 60 is depicted as a simple mechanism supporting the illuminating device 10 and the imaging device 20.

The processing device 30 is configured to control the illuminating device 10, the imaging device 20, and the supporting device 40. Further, the processing device 30 functions as an image processing device for processing an image obtained from the imaging device 20. The processing device 30 may be a device including memory storing one or more programs and one or more processors operating according to the one or more programs (e.g., a personal computer or the like). Additionally, the processing device 30 includes a display.

The processing device 30 is configured to perform an inspection process and a pre-inspection process.

In the pre-inspection process, the processing device 30 forms one or more templates used in the inspection process. The pre-inspection process includes an imaging step (a pre-inspection imaging step) and a template forming step.

Figure 4A:
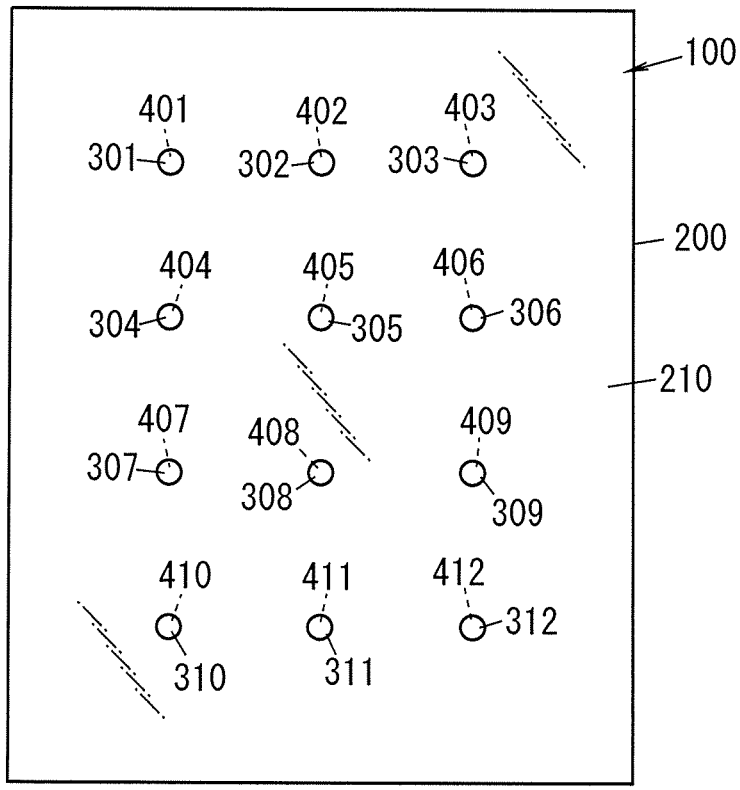
FIG. 4A is a schematic view of a product to be inspected by the above inspecting method.

The pre-inspection imaging step is a step of taking an image of a product 100 to be compared. Before performance of the pre-inspection imaging step, the product 100 to be compared is placed on the stage 50 of the supporting device 40. The product 100 to be compared may be a product 100 without defects, for example. In the product 100 without defects, as shown in FIG. 4A, twelve parts 301 to 312 are placed at twelve predetermined positions 401 to 412, respectively, and any of the twelve parts 301 to 312 is not broken, for example.

In the pre-inspection imaging step, the processing device 30 takes an image of the front surface 210 by the imaging device 20 with the front surface 210 being illuminated by the illuminating device 10 (i.e., an image obtained by taking the product 100 from the front surface 210 of the transparent substrate 200). For example, the processing device 30 controls the illuminating device 10, the imaging device 20, and the moving mechanism 60 to take an image of the whole of the front surface 210 by the imaging device 20. In more detail, the processing device 30 takes multiple partial images of the front surface 210 of the transparent substrate 200 by the imaging device 20 at multiple positions in the length direction of the transparent substrate 200, and connects the multiple partial images of the front surface 210 to form an entire image of the front surface 210. Forming the entire image from the multiple partial images can be realized by conventional techniques, and therefore no detailed explanation thereof is given.

Figure 4B:
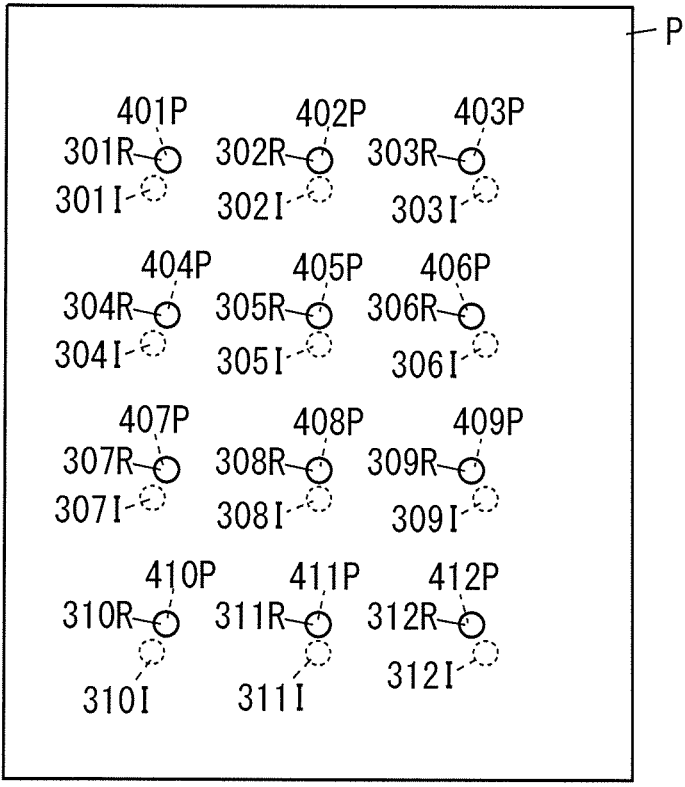
FIG. 4B is a schematic view of an image of the product of FIG. 4A.

The pre-inspection imaging step gives an image P shown in FIG. 4B, for example. In the image P, real images 301R to 312R of the parts 301 to 312 appear at positions 401P to 412P corresponding to the predetermined positions 401 to 412, respectively. Further, virtual images 301I to 312I appear in vicinities of the real images 301R to 312R, respectively.

Figure 5A:
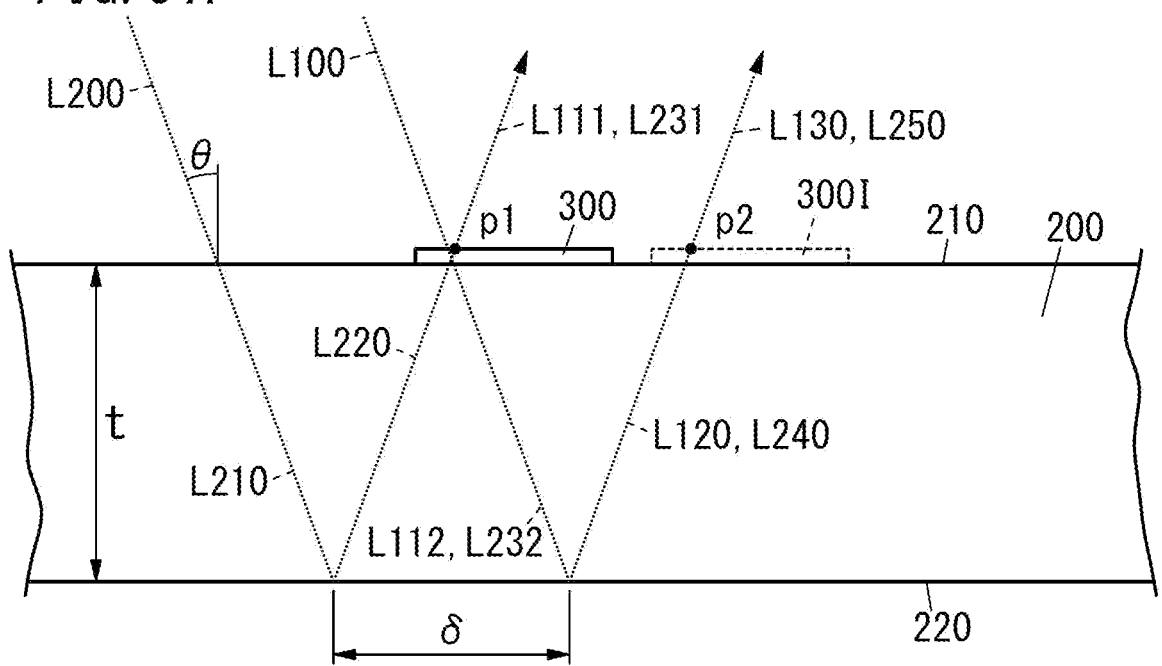
FIG. 5A and FIG. 5B are explanatory view for illustration of a relationship between a real image and a virtual image of a part of the product.

The virtual images 301I to 312I may appear due to reflection of light from the rear surface 220 of the transparent substrate 200. For example, as shown in FIG. 5A, it is assumed that light rays L100 and L200 come toward the front surface 210 of the transparent substrate 200. The light ray L100 strikes the part 300 at a position p1, and this may cause a light ray L111 reflected from the part 300 and a light ray L112 passing through the part 300 and entering the transparent substrate 200. The light ray L112 strikes the rear surface 220 of the transparent substrate 200, thereby causing a light ray L120 reflected from the rear surface 220. The light ray L120 causes a light ray L130 emerging outside through a position p2. In contrast, the light ray L200 strikes the front surface 210, thereby causing a light ray L210 entering the transparent substrate 200. The light ray L210 strikes the rear surface 220 of the transparent substrate 200, thereby causing a light ray L220 reflected from the rear surface 220. The light ray L220 strikes the part 300 at the position p1, thereby causing a light ray L232 reflected from the part 300 and a light ray L231 emerging outside through the part 300. The light ray L232 strikes the rear surface 220 of the transparent substrate 200, thereby causing a light ray L240 reflected from the rear surface 220. The light ray L240 strikes the front surface 210, thereby causing a light ray L250 emerging outside though the position p2. As a result, the product 100 appears to have a virtual image 300I of the part 300 present in a vicinity of the part 300 (that is, a real image 300R). Note that, only for simplifying the illustration of FIG. 3A, refraction of light rays are not depicted.

The template forming step is a step of forming templates T1, T2, and T3 each indicative of a positional relationship between the real image 300R and the virtual image 300I, of the part 300 (see FIG. 1). In the template forming step, the processing device 30 forms one or more templates each indicative of the positional relationship between the real image 300R and the virtual image 300I, of the part 300 based on the image P taken in the pre-inspection imaging step. Further, the processing device 30 stores the templates T1, T2, and T3 formed in the template forming step.

Figure 5B:
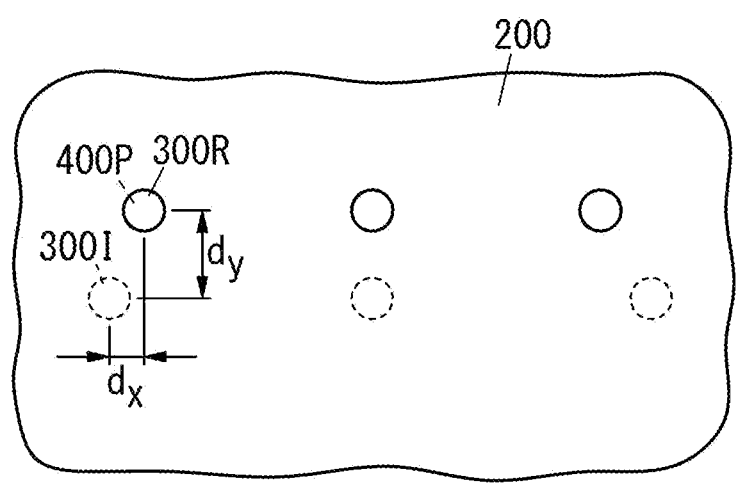

The positional relationship between the real image 300R and the virtual image 300I can be determined by a distance dx and a distance dy, as shown in FIG. 5B, for example. The distance dx is defined as a distance between the real image 300R and the virtual image 300I in the width direction of the transparent substrate 200 (corresponding to an x direction of the image P, for example). The distance dy is defined as a distance between the real image 300R and the virtual image 300I in the length direction of the transparent substrate 200 (corresponding to a y direction of the image P, for example). The distance dy may be considered to be equal to a distance δ between the position p1 and the position p2 in FIG. 5A. The distance δ is given by $2t^* \tan \theta$. t denotes a thickness of the transparent substrate 200 and θ denotes an incident angle of light. In the inspection system, the illuminating device 10 emits light to entirely illuminate the front surface 210 in the width direction of the transparent substrate 200, and the imaging device 20 takes the entire image of the front surface 210 in the width direction of the transparent substrate 200. Therefore, distances of the plurality of predetermined positions 400 to the optical axis of the imaging device 20 in the length direction of the transparent substrate 200 are substantially equal to each other. Accordingly, as to the plurality of predetermined positions 400, the distances dy are substantially equal to each other. In contrast, distances of the plurality of predetermined positions 400 to the optical axis of the imaging device 20 in the width direction of the transparent substrate 200 may be different from each other in some cases. Accordingly, as to the plurality of predetermined positions 400, the distances dx may be different from each other. As understood from the above, each distance dx may vary depending on the positional relationship between the optical axis of the imaging device 20 and a corresponding predetermined position 400. Regarding the part 300 close to the optical axis of the imaging device 20 in the width direction of the transparent substrate 200, the distance dx between the real image 300R and the virtual image 300I may tend to decrease. In contrast, regarding the part 300 far from the optical axis of the imaging device 20 in the width direction of the transparent substrate 200, the distance dx between the real image 300R and the virtual image 300I may tend to increase. Accordingly, the distance dx can be defined as a function of positions of the optical axis of the imaging device 20 and the part 300 in the width direction of the transparent substrate 200.

For example, the parts 301, 304, 307, and 310 of the product 100 are on the left side of the optical axis of the imaging device 20. In the image P, the virtual images 301I, 304I, 307I, and 310I shift left from the real images 301R, 304R, 307R, and 310R, respectively. The parts 303, 306, 309, and 312 of the product 100 are on the right side of the optical axis of the imaging device 20. In the image P, the virtual images 303I, 306I, 309I, and 312I shift right from the real images 303R, 306R, 309R, and 312R, respectively. The parts 302, 305, 308, and 311 of the product 100 are beneath the optical axis of the imaging device 20. In the image P, the virtual images 302I, 305I, 308I, and 311I do not shift left and right from the real images 302R, 305R, 308R, and 311R, respectively.

The parts 301, 304, 307, and 310 each give a positional relationship where the virtual image 300I shifts left from the real image 300R in the image P. The parts 302, 305, 308, and 311 each give a positional relationship where the virtual image 300I does not shift from the real image 300R in the image P. The parts 303, 306, 309, and 312 each give a positional relationship where the virtual image 300I shifts right from the real image 300R in the image P. Thus, the processing device 30 form three templates T1, T2, and T3 as shown in FIG. 1. The template T1 represents a positional relationship where the virtual image 300I shifts left from the real image 300R. The template T2 represents a positional relationship where the virtual image 300I does not shift from the real image 300R. The template T3 represents a positional relationship where the virtual image 300I shifts right from the real image 300R. The template T1 is associated with the predetermined positions 401, 404, 407, and 410, and is used to detect a lack or breakage of the parts 301, 304, 307, and 310. The template T2 is associated with the predetermined positions 402, 405, 408, and 411, and is used to detect a lack or breakage of the parts 302, 305, 308, and 311. The template T3 is associated with the predetermined positions 403, 406, 409, and 412, and is used to detect a lack or breakage of the parts 303, 306, 309, and 312.

As already described above, the processing device 30 derives a positional relationship between the real image 300R and the virtual image 300I for each of the parts 300 at the predetermined positions 400, from the image P of the product 100 without defects. The processing device 30 forms a template representing the positional relationship derived and stores the template in association with the predetermined positions 400. The template is indicative of the positional relationship between the real image 300R and the virtual image 300I, of the part 300 in a case where the part 300 is placed at the predetermined position 400 correctly.

In the present embodiment, the processing device 30 uses a common template for predetermined positions 400 giving the positional relationships between the real image 300R and the virtual image 300I which are considered to be substantially the same as each other. The processing device 30 classifies the plurality of predetermined positions 400 into one or more groups based on degree of similarity of the positional relationship between the real image 300R and the virtual image 300I, and forms a template for each of the one or more groups. The processing device 30 stores one or more templates in association with the one or more groups.

Next, the inspection process is described. In the inspection process, the processing device 30 performs inspection of the product 100. The inspection process includes an imaging step (an inspection-purpose imaging step), an evaluating step, and a determining step.

The inspection-purpose imaging step is a step of taking an image of the product 100 to be inspected. Before performance of the inspection-purpose imaging step, the product 100 to be inspected is placed on the stage 50 of the supporting device 40. In the inspection-purpose imaging step, the processing device 30 takes an image of the front surface 210 by the imaging device 20 with the front surface 210 being illuminated by the illuminating device 10 (i.e., an image obtained by taking the product 100 from the front surface 210 of the transparent substrate 200). For example, the processing device 30 controls the illuminating device 10, the imaging device 20, and the moving mechanism 60 to take an image of the whole of the front surface 210 by the imaging device 20. In more detail, the processing device 30 connects multiple partial images of the front surface 210 to form an entire image of the front surface 210. Forming the entire image from the multiple partial images can be realized by conventional techniques, and therefore no detailed explanation thereof is given.

The evaluating step is a step of evaluating a degree of matching between an image which is derived from the image taken by the imaging device 20 and represents a position 400P corresponding to the predetermined position 400 and its vicinity, and a template.

In the evaluating step, the processing device 30 extracts an image representing the position 400P corresponding to the predetermined position 400 and its vicinity, from the image taken by the imaging device 20 (the image taken in the inspection-purpose imaging step). The processing device 30 selects an extracted image as a matching area. The matching area may be equal to or larger in size than the template. Preferably the matching area may not overlap with another matching area. The processing device 30 performs matching between an image inside the matching area and the template corresponding to the position 400P to evaluate the degree of matching. Note that, matching using templates may be realized by conventional techniques and therefore detailed explanation may not be given.

In one example, the image P10 shown in FIG. 1 is assumed to be obtained in the inspection-purpose imaging step. In this case, the processing device 30 extracts as matching areas R1, R4, R7, and R10 from the image P10, images respectively representing positions 401P, 404P, 407P, and 410P corresponding to the predetermined positions 401, 404, 407, and 410 and their vicinities. The processing device 30 performs matching between an image inside each of the matching areas R1, R4, R7, and R10 and the template T1 corresponding to the predetermined positions 401, 404, 407, and 410 to evaluate the degree of matching. Similarly, the processing device 30 performs matching between an image inside each of the matching areas R2, R5, R8, and R11 and the template T2 corresponding to the predetermined positions 402, 405, 408, and 411 to evaluate the degree of matching. Further, the processing device 30 performs matching between an image inside each of the matching areas R3, R6, R9, and R12 and the template T3 corresponding to the predetermined positions 403, 406, 409, and 412 to evaluate the degree of matching. By doing so, the processing device 30 evaluates the degree of matching for all the predetermined positions 400.

The determining step is a step of determining, when the degree of matching is equal to or larger than a predetermined threshold, that the part 300 is placed at the predetermined position 400 without being broken. Further, the determining step is a step of determining, when the degree of matching is smaller than the predetermined threshold, that the part 300 is not placed at the predetermined position 400 or broken. Note that, the predetermined threshold value may be selected based on a degree of matching between an actual image where the part 300 is lacked ant the template, or a degree of matching between an actual image where a part is broken, and the template.

In the determining step, the processing device 30 compares the degree of matching regarding the predetermined position 400 calculated in the evaluating step with the predetermined threshold. The processing device 30 determines the part 300 is placed at the predetermined position 400 without being broken when the degree of matching is equal to or larger than the threshold value. The processing device 30 determines the part 300 is not placed at the predetermined position 400 or broken when the degree of matching is smaller than the threshold value.

For example, in the image P10 shown in FIG. 1, the degrees of matching regarding the matching areas R1 to R5, R7, and R9 to R12 are equal to or larger than the predetermined threshold. In contrast, the degrees of matching regarding the matching areas R6 and R8 are smaller than the predetermined threshold. Therefore, regarding the matching areas R1 to R5, R7, and R9 to R12, the processing device 30 determines the part 300 is placed at the predetermined position 400 without being broken. Meanwhile, regarding the matching areas R6 and R8, the processing device 30 determines there is a lack or breakage of the part 300. Note that, in the image P10 shown in FIG. 1, breakage of the part 306 occurs in the matching area R6 and a lack of the part 308 occurs in the matching area R8.

Further, in the determining step, the processing device 30 displays a result of determination. For example, the processing device 30 displays the image P10 shown in FIG. 1 together with the matching areas R1 to R12, on a display device. Additionally, the processing device 30 displays the result of determination, on the display device. In this case, the processing device 30 displays a result that the part 300 is placed at the predetermined position 400 without being broken, regarding the matching areas R1 to R5, R7, and R9 to R12. The processing device 30 displays a result that there is a lack or breakage of the part 300, regarding the matching areas R6 and R8. Note that, the result of determination may be shown by text, predetermined words (e.g., "passed", "failed", "OK", and "NG"), symbols (e.g., "o" and "x"), or the like. If a lack or breakage of the part 300 can be found in at least one of the plurality of matching areas R1 to R12, the result of determination of the product 100 indicates failure.

As described above, the inspecting method and the inspection system evaluate the degree of matching between an image which is derived from the image taken by the imaging device 20 and represents a position corresponding to the predetermined position 400 and its vicinity, and the template. In this regard, the template is indicative of a positional relationship between the real image 300R and the virtual image 300I, of the part 300 in a case where the part 300 is placed at the predetermined position 400 correctly. In more detail, since the product 100 including the transparent substrate 200 may cause the virtual image 300I of the part 300, the degree of matching is evaluated based on the positional relationship between the real image 300R and the virtual image 300I of the part 300. Therefore, it is possible to reduce probabilities accuracy of the inspection is decreased due to presence of the virtual image 300I. Accordingly, the inspecting method and the inspection system can improve accuracy of inspection for the product 100 including the transparent substrate 200.

Hereinafter, a manufacturing method of the product 100 is described. The manufacturing method includes a processing step, an inspecting step, and a reprocessing step, for example.

The processing step is a step of performing a forming process of forming the part 300 at the predetermined position 400 within the front surface 210 of the transparent substrate 200. The forming process includes preparing the transparent substrate 200 and subsequently forming the part 300 at the predetermined position 400 within the front surface 210 of the transparent substrate 200. A method for forming the part 300 may depend on the part 300.

The inspecting step is a step of performing inspection of the product 100 by the inspecting method described above. In other words, the inspecting step is a step of determining whether or not the part 300 is formed correctly at the predetermined position 400 by the forming process.

The reprocessing step is a step of performing the forming process again when a result of the inspection indicates failure. In a case of the image P10 of FIG. 1, it is determined that there is a lack or breakage of the part 300, regarding the matching areas R6 and R8. Therefore, the result of inspection indicates failure, and the forming process is performed again.

According to this manufacturing method, the forming process is performed again when the result of inspection indicates failure. Therefore, it is possible to improve quality of the product 100 including the transparent substrate 200.

2. Variations

Embodiments according to the present disclosure may not be limited to the above embodiment. The above embodiment may be modified in various ways depending on design or the like as long as it can solve the problem of the present disclosure.

For example, in one variation, the imaging step (the pre-inspection imaging step and the inspection-purpose imaging step) may include removing, with one or more polarization filters, from light to be received by the imaging device 20, reflected light due to an object present on or over the rear surface 220 of the transparent substrate 200. Examples of an object present on or over the rear surface 220 of the transparent substrate 200 may include the stage 50.

Figure 6:
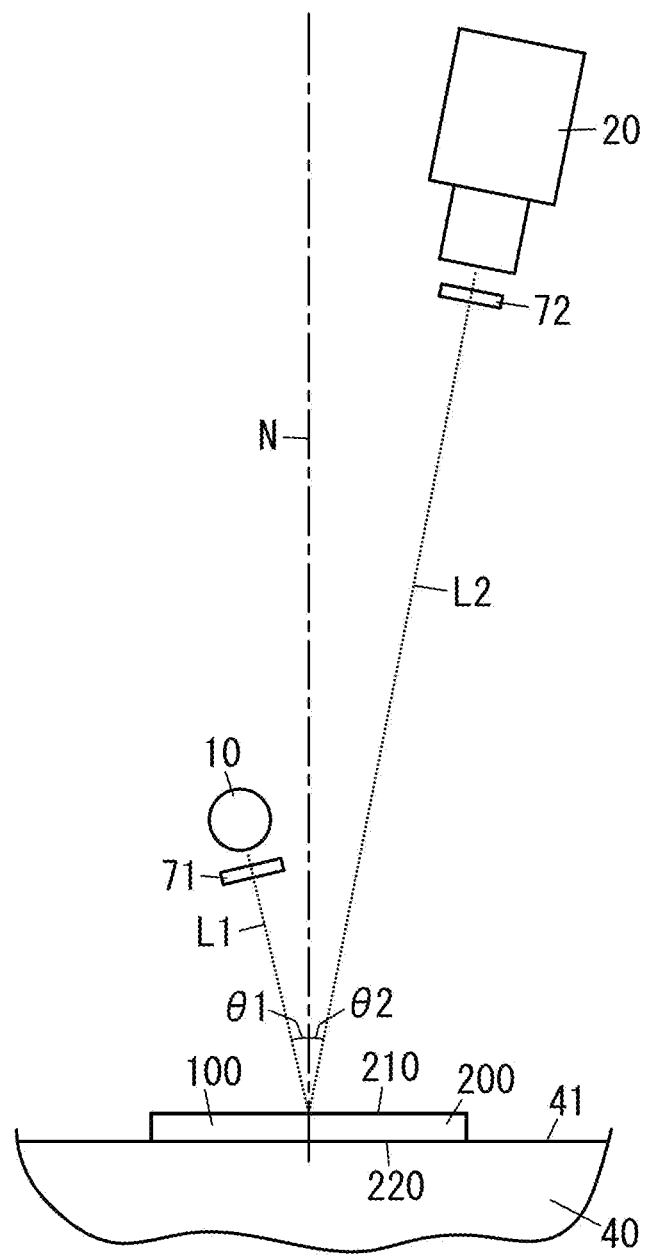
FIG. 6 is a schematic view of primary part of an inspection system of a variation.

In this case, the inspection system may include one or more polarization filters for removing, from light to be received by the imaging device 20, reflected light due to an object present on or over the rear surface 220 of the transparent substrate 200. As shown in FIG. 6, the inspection system includes a polarization filter (first polarization filter) 71 placed in front of the illuminating device 10 and a polarization filter (second polarization filter) 72 placed in front of the imaging device 20, for example.

For example, the first polarization filter 71 and the second polarization filter 72 each are a linear polarization filter. The first polarization filter 71 is placed between the illuminating device 10 and the product 100 to allow components with a first oscillation direction perpendicular to a travelling direction of light to pass therethrough. The second polarization filter 72 is placed between the imaging device 20 and the product 100 to allow components with a second oscillation direction perpendicular to the travelling direction of light and the first oscillation direction to pass therethrough. In one example, the first oscillation direction is parallel to the length direction of the transparent substrate 200 and the second oscillation direction is parallel to the width direction of the transparent substrate 200.

When the part 300 has polarization properties, and light reflected from the part 300 and light transmitted by the part 300 have the second oscillation direction, the light reflected from the part 300 and the light transmitted by the part 300 pass through the second polarization filter 72. In contrast, when the transparent substrate 200 has no polarization properties, light from the illuminating device 10 except the light reflected from the part 300 and the light transmitted by the part 300 still has the first oscillation direction and therefore fails to pass through the second polarization filter 72. Therefore, reflected light caused by an object present on or over the rear surface 220 of the transparent substrate 200 (e.g., the stage 50) can be removed from light received by the imaging device 20. Accordingly, it is possible to reduce probabilities that an image of an object which has no relation with the product 100 and is in back of the product 100 exists in an image from the imaging device 20. As a result, it is possible to improve accuracy of the inspection of the product 100 including the transparent substrate 200.

Figure 7A:
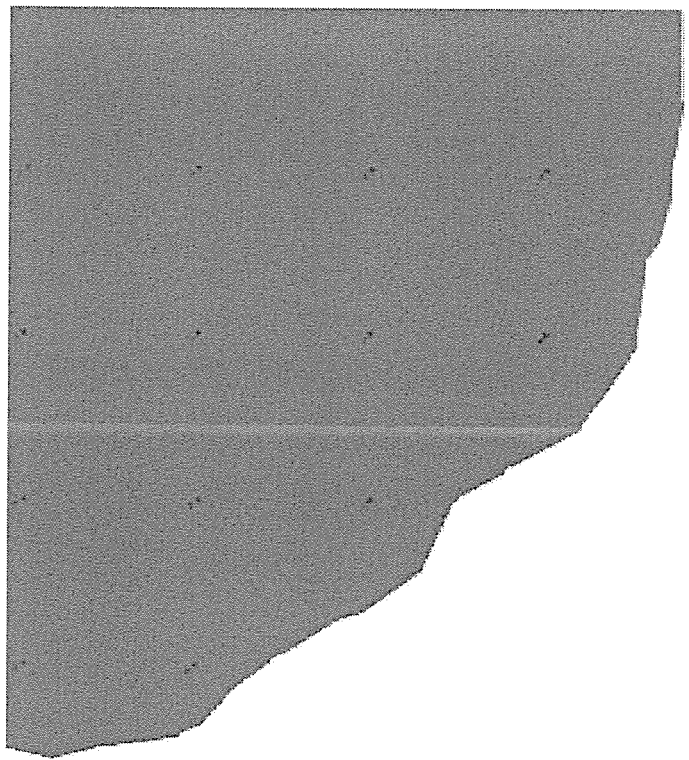
FIG. 7A is illustration for an image of the product with a polarization filter.
Figure 7B:
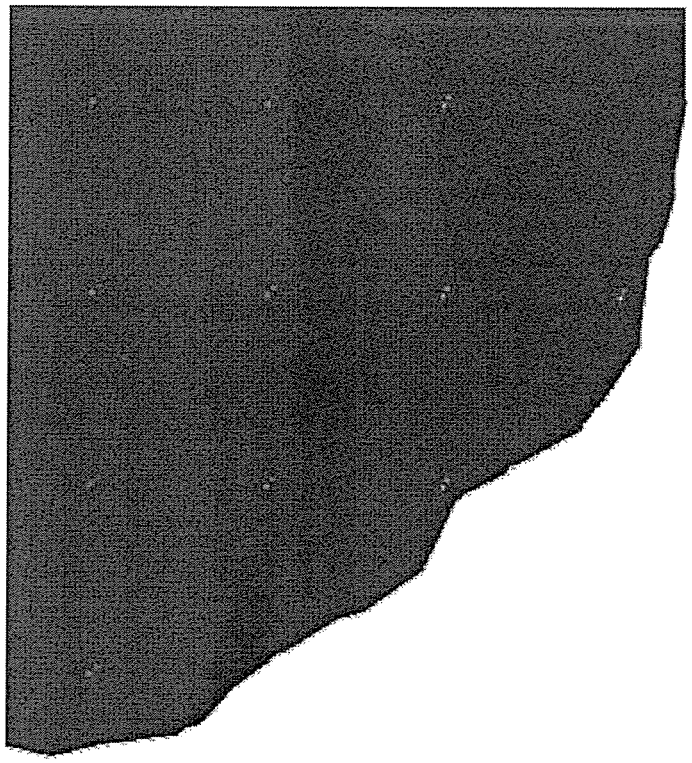
FIG. 7B is illustration for an image of the product without the polarization filter.

For example, FIG. 7A shows part of an image from the imaging device 20 obtained in the above embodiment. In FIG. 7A, the real images 300R and the virtual images 300I appear to be black and the object behind the transparent substrate 200 (the bearing surface 51 of the stage 50) appears to be gray. In contrast, FIG. 7B shows part of an image from the imaging device 20 obtained in the variation. In FIG. 7B, the real images 300R and the virtual images 300I appear to be white and the bearing surface 51 appears to be black. Obviously from FIG. 7A and FIG. 7B, the variation shows a contrast between the real image 300R and the object behind the transparent substrate 200 and a contrast between the virtual image 300I and the object appear to be stronger.

Thus, it is possible to easily distinguish the real image 300R and the virtual image 300I from the object behind the transparent substrate 200, and accuracy of matching by the processing device 30 therefore can be improved. As a result, accuracy of inspection of the product 100 including the transparent substrate 200 can be improved.

Additionally, the bearing surface 51 where the product 100 is placed includes a glossy and flat surface. In other words, a surface which faces the rear surface 220 of the transparent substrate 200 may be glossy and flat. Accordingly, reflection at the bearing surface 51 does not cause a change in oscillation direction of light. Thus, it is possible to certainly remove reflected light caused by the object present on or over the rear surface 220 of the transparent substrate 200 from light received by the imaging device 20. Consequently, it is possible to improve accuracy of inspection of the product 100 including the transparent substrate 200.

Note that, in this variation, the first and second polarization filters 71 and 72 remove reflected light due to an object present on or over the rear surface 220 of the transparent substrate 200 from light received by the imaging device 20. However, one or more polarization filters may be used as alternatives to the first and second polarization filters 71 and 72. Such one or more polarization filters may include linear polarization filters, circular polarization filters, or elliptical polarization filters. In summary, it may be sufficient that reflected light due to an object present on or over the rear surface 220 of the transparent substrate 200 is removed from light received by the imaging device 20. Such one or more polarization filters may be selected in consideration of properties of light from the illuminating device 10, polarization properties of the transparent substrate 200, polarization properties of the part 300, polarization properties of the bearing surface 51 of the stage 50, and the like.

In the above embodiment, the illuminating device 10 is a linear light source. However, in other variations, the illuminating device 10 may not be a linear light source. Note that, when the illuminating device 10 is a linear light source, it is possible to easily suppress light reflected from an object with no relation with the product 100 from entering the imaging device 20. Accordingly, it may be preferable that the illuminating device 10 is a linear light source.

In the above embodiment, the imaging device 20 is a line camera. In other variations, the imaging device 20 may not be a line camera. In other words, the imaging device 20 may not be limited particularly as long as at least an image representing the predetermined position 400 and its vicinity, of the front surface 210 of the transparent substrate 200 can be obtained. However, when the transparent substrate 200 is relatively large and has a plate shape, the imaging device 20 may preferably be a line camera.

In the above embodiment, templates are formed from an actual image of a product without defects in the pre-inspection process. Alternatively, such templates may be formed based on results of simulation, for example. In summary, the pre-inspection process may be optional.

In the above embodiment, the degree of matching is compared with the predetermined threshold in the determining step. Alternatively, in variations, the degree of matching may be compared with a first threshold and a second threshold in the determining step. The first threshold may be equal to the predetermined threshold. The second threshold is a threshold for determining whether a part is not placed at a predetermined position or is broken. The degree of matching using the template for a case where the part 300 is lacked may be considered to be smaller than that for a case where the part 300 is broken. Therefore, the second threshold is smaller than the first threshold. Thus, in the determining step of such variations, the part is determined to be placed at the predetermined position without being broken when the degree of matching is equal to or larger than the first threshold. The part is determined to be broken when the degree of matching is smaller than the first threshold and is equal to or larger than the second threshold. The part is determined not to be placed at the predetermined position when the degree of matching is smaller than the second threshold. According to these variations, it is possible to give detailed analysis for the result of inspection.

In the above embodiment, the stage 50 of the supporting device 40 is a support including the bearing surface 51 for bearing the product 100. Alternatively, the stage 50 may be a conveyor for conveying the product 100. Examples of the conveyor may include a roller conveyor and a belt conveyor. Especially, a conveyor for taking the transparent substrate 200 in and out from equipment for placing the parts 300 on the transparent substrate 200 can be used as the stage 50. Note that, as to a roller conveyor including a plurality of rollers arranged at regular intervals along their rotational axes, plate members may be placed to cover gaps between the plurality of rollers. These plate members may preferably have surfaces facing the rear surface 220 of the transparent substrate 200, the surfaces being glossy and flat surfaces.

3. Aspects According to Present Disclosure

As obviously derived from the embodiment and variations described above, the inspecting method of a first aspect according to the present disclosure is an inspecting method for a product (100) including a transparent substrate (200) and a part (300) placed at a predetermined position (400) within a front surface (210) of the transparent substrate (200). The inspecting method of the first aspect includes: an imaging step and an evaluating step. The imaging step is a step of taking an image (P, P10) of the front surface (210) by an imaging device (20) with the front surface (210) being illuminated by an illuminating device (10). The evaluating step is a step of evaluating a degree of matching between an image (R1 to R12) which is derived from the image (P, P10) taken by the imaging device (20) and represents a position (400P) corresponding to the predetermined position (400) and its vicinity, and a template (T1, T2, T3). The template (T1, T2, T3) is indicative of a positional relationship between a real image (300R) and a virtual image (300I), of the part (300) in a case where the part (300) is placed at the predetermined position (400) correctly. The first aspect can improve accuracy of inspection for a product (100) including a transparent substrate (200).

The inspecting method of a second aspect according to the present disclosure would be realized in combination with the first aspect. The inspecting method of the second aspect further includes a determining step. The determining step is a step of determining, when the degree of matching is equal to or larger than a predetermined threshold, that the part (300) is placed at the predetermined position (400) without being broken. The determining step is a step of determining, when the degree of matching is smaller than the predetermined threshold, that the part (300) is not placed at the predetermined position (400) or broken. The second aspect can facilitate determining whether a result of inspection is pass or failure.

The inspecting method of a third aspect according to the present disclosure would be realized in combination with the first or second aspect. In the inspecting method of the third aspect, the imaging step includes arranging the illuminating device (10) and the imaging device (20) to allow the imaging device (20) to receive light which is part of light from the illuminating device (10) and specularly reflected from the front surface (210). The third aspect can improve accuracy of inspection for a product (100) including a transparent substrate (200).

The inspecting method of a fourth aspect according to the present disclosure would be realized in combination with any one of the first to third aspects. In the inspecting method of the fourth aspect, the imaging step includes removing, with one or more polarization filters (71, 72), from light to be received by the imaging device (20), reflected light due to an object present on or over a rear surface (220) of the transparent substrate (200). The fourth aspect can improve accuracy of inspection for a product (100) including a transparent substrate (200).

The inspection system of a fifth aspect according to the present disclosure is an inspection system for a product (100) including a transparent substrate (200) and a part (300) placed at a predetermined position (400) within a front surface (210) of the transparent substrate (200). The inspection system of the fifth aspect includes: an illuminating device (10) configured to emit light to the front surface (210); an imaging device (20) configured to take an image (P, P10) of the front surface (210); and a processing device (30) configured to perform the inspecting method according to the first aspect. The fifth aspect can improve accuracy of inspection for a product (100) including a transparent substrate (200).

The inspection system of a sixth aspect according to the present disclosure would be realized in combination with the fifth aspect. In the inspection system of the sixth aspect, the processing device (30) is configured to, when the degree of matching is equal to or larger than a predetermined threshold, determine that the part (300) is placed at the predetermined position (400) without being broken. The processing device (30) is configured to, when the degree of matching is smaller than the predetermined threshold, determine that the part (300) is not placed at the predetermined position (400) or broken. The sixth aspect can facilitate determining whether a result of inspection is pass or failure.

The inspection system of a seventh aspect according to the present disclosure would be realized in combination with the fifth or sixth aspect. In the inspection system of the seventh aspect, the illuminating device (10) and the imaging device (20) are arranged to allow the imaging device (20) to receive light which is part of light from the illuminating device (10) and specularly reflected from the front surface (210). The seventh aspect can improve accuracy of inspection for a product (100) including a transparent substrate (200).

The inspection system of an eighth aspect according to the present disclosure would be realized in combination with any one of the fifth to seventh aspects. The inspection system of the eighth aspect further includes one or more polarization filters (71, 72) for removing, from light to be received by the imaging device (20), reflected light due to an object present on or over a rear surface (220) of the transparent substrate (200). The eighth aspect can improve accuracy of inspection for a product (100) including a transparent substrate (200).

The manufacturing method of a ninth aspect according to the present disclosure is a manufacturing method for a product (100) including a transparent substrate (200) and a part (300) placed at a predetermined position (400) within a front surface (210) of the transparent substrate (200). The manufacturing method of the ninth aspect includes a step of performing a forming process of forming the part (300) at the predetermined position (400) within the front surface (210) of the transparent substrate (200). The manufacturing method of the ninth aspect further includes a step of performing inspection of the product (100) by the inspecting method according to any one of the first to fourth aspects. The manufacturing method of the ninth aspect further includes a step of performing the forming process again when a result of the inspection indicates failure. The ninth aspect can improve quality of a product (100) including a transparent substrate (200).

REFERENCE SIGNS LIST

10 Illuminating Device
20 Imaging Device
30 Processing Device
71 First Polarization Filter (Polarization Filter)
72 Second Polarization Filter (Polarization Filter)
100 Product
200 Transparent Substrate
210 Front Surface
220 Rear Surface
300, 301 to 312 Part
400, 401 to 412 Predetermined Position
R1 to R12 Matching Area
300R, 301R to 312R Real Image
300I, 301I to 312I Virtual Image
400P, 401P to 412P Position
P, P10 Image
T1, T2, T3 Template

The invention claimed is:

1. An inspecting method for a product including a transparent substrate and a part placed at a predetermined position within a front surface of the transparent substrate,
the method comprising:
an imaging step of taking an image of the front surface by an imaging device with the front surface being illuminated by an illuminating device; and
an evaluating step of evaluating a degree of matching between an image which is derived from the image taken by the imaging device and represents a position corresponding to the predetermined position and its vicinity, and a template, the template being indicative of a positional relationship between a real image and a virtual image, of the part in a case where the part is placed at the predetermined position correctly, and
a determining step of determining, when the degree of matching is equal to or larger than a predetermined threshold, that the part is placed at the predetermined position without being broken, and of determining, when the degree of matching is smaller than the predetermined threshold, that the part is not placed at the predetermined position or broken.

2. The inspecting method according to claim 1, wherein the imaging step includes arranging the illuminating device and the imaging device to allow the imaging device to receive light which is part of light from the illuminating device and specularly reflected from the front surface.

3. The inspecting method according to claim 1, wherein the imaging step includes removing, with one or more polarization filters, from light to be received by the imaging device, reflected light due to an object present on or over a rear surface of the transparent substrate.

4. An inspection system for a product including a transparent substrate and a part placed at a predetermined position within a front surface of the transparent substrate, the system comprising:

an illuminating device configured to emit light to the front surface;

an imaging device configured to take an image of the front surface; and a processing device configured to perform an inspecting method, the method comprising:

an imaging step of taking an image of the front surface by an imaging device with the front surface being illuminated by an illuminating device; and an evaluating step of evaluating a degree of matching between an image which is derived from the image taken by the imaging device and represents a position corresponding to the predetermined position and its vicinity, and a template, the template being indicative of a positional relationship between a real image and a virtual image, of the part in a case where the part is placed at the predetermined position correctly, wherein the processing device is configured to:

when the degree of matching is equal to or larger than a predetermined threshold, determine that the part is placed at the predetermined position without being broken; and when the degree of matching is smaller than the predetermined threshold, determine that the part is not placed at the predetermined position or broken.

5. The inspection system according to claim 4, wherein the illuminating device and the imaging device are arranged to allow the imaging device to receive light which is part of light from the illuminating device and specularly reflected from the front surface.

6. The inspection system according to claim 4, further comprising one or more polarization filters for removing, from light to be received by the imaging device, reflected light due to an object present on or over a rear surface of the transparent substrate.

7. A manufacturing method for a product including a transparent substrate and a part placed at a predetermined position within a front surface of the transparent substrate, the method comprising:

a step of performing a forming process of forming the part at the predetermined position within the front surface of the transparent substrate;

a step of performing inspection of the product by the inspecting method according to claim 1;

a step of performing the forming process again when a result of the inspection indicates failure.

* * * * *